2,866,776

PROCESS FOR MAKING POLYSULFIDE
LIQUID POLYMERS

William R. Nummy, Midland, Mich., assignor to The Dow Chemical Company, Midland, Mich., a corporation of Delaware No Drawing. Application April 4, 1956
Serial No. 575,950

11 Claims. (Cl. 260—79)

This invention concerns a process for making liquid polysulfide polymers containing reactive mercapto groups from di(2-mercaptoethyl)ethers of diols. It relates more particularly to a process and agents for catalyzing the condensation or oxidation of di(2-mercaptoethyl)ethers of diols having the general formula:

$$HSCH_2CH_2-O-(RO)_n-CH_2CH_2SH$$

wherein RO represents an oxyalkylene radical selected from the group consisting of oxethylene, oxy-1,2-propylene, oxy-1,3-propylene, oxy-1,2-butylene, oxy-2,3-butylene, and oxy-1,4-butylene, and $n$ is a whole number from 1 to 4, to form liquid polymers of the same containing reactive mercapto groups.

It is a primary object of the invention to provide a process for making liquid polymers from di(2-mercaptoethyl)ethers of diols having the above general formula, which liquid polymers contain reactive mercapto groups and are capable of being cured, e. g. by treatment with oxidizing agents, to form solid rubbery polysulfide polymers. Another object is to provide a process and agents for catalyzing the oxidation, i. e. the condensation, of di(2-mercaptoethyl)ethers of diols having the above formula to produce liquid polymers containing reactive mercapto groups. A further object is to provide new agents for catalyzing the condensation of di(2-mercaptoethyl) ethers of the above general formula by reaction with oxygen to produce polysulfide liquid polymers. Other and related objects may appear from the following description of the invention.

According to the invention di(2-mercaptoethyl)ethers of diols, which ethers have the above formula, can readily be polymerized, i. e. condensed by reaction of two or more molecules of the same or different compounds with one another, by oxidizing the compounds with air or oxygen in the presence of small but effective amounts of both an inorganic iron salt, e. g. ferric chloride or ferric sulfate, and ammonia or a primary amine, preferably in admixture with trace amounts of water or water vapors.

It has been found that carrying out of the condensation or oxidation in the presence of both an inorganic iron salt, e. g. ferric chloride, and ammonia or a primary amine results in a faster rate of reaction than is obtained in carrying out of the reaction in the presence of either the iron salt or ammonia or a primary amine alone. The employment of both an iron salt and ammonia or a primary amine appears to have a synergistic action for catalyzing the condensation or oxidation reaction and results in substantial improvement for effecting the condensation over that obtained by carrying out of the reaction with either of the agents alone under otherwise similar reaction conditions.

The di(2-mercaptoethyl)ethers of diols to be employed as starting material can be prepared by a series of well defined steps. An unsaturated divinyl ether of a diol, e. g. ethylene glycol, 1,2-propylene glycol, 2,3-butylene glycol, 1,4-butane diol, etc., can be prepared by reacting acetylene with the diol employing procedure similar to that described in U. S. Patent No. 1,959,927. In brief a divinyl ether of a diol such as diethylene glycol can be prepared by heating a mixture of acetylene, diethylene glycol and a strong alkali, e. g. potassium hydroxide, in amount corresponding to from 3 to 6 percent by weight of the mixture, in a reaction zone at temperatures between 140° and 200° C. and superatmospheric pressures of from 50 to 90 pounds per square inch, gauge. The crude product is distilled to recover the divinyl ether. The distillate usually contains a small amount, e. g. 15 percent by weight or less, of monovinyl ether. The latter is soluble in water and can be separated from the divinyl ether by extraction with water, after which the water-insoluble divinyl ether of the diol can be further purified by distillation, if desired.

The divinyl ether of a diol, e. g. divinyl ether of diethylene glycol, is converted to the corresponding dimercaptan such as di(2-mercaptoethyl)ether of diethylene glycol by reaction of the divinyl ether of diethylene glycol with hydrogen sulfide in the presence of a photosensitizer and actinic radiation such as ultraviolet light of wave lengths below 3000 A. In brief, a mixture of hydrogen sulfide, a divinyl ether of a diol, e. g. divinyl ether of diethylene glycol, is fed at temperatures between 0° and 25° C. and under pressures suitably of from 150 to 500 pounds per square inch, through a reaction zone wherein it is exposed to ultraviolet light of wave lengths less than 3000 A. The product, i. e. di(2-mercaptoethyl)ether of the diol, is recovered in usual ways, e. g. by distillation of the reacted mixture.

The invention involves the condensation or polymerization, i. e. the reaction of two or more molecules of the same or different di(2-mercaptoethyl)ethers of diols having the aforementioned general formula, by oxidizing the compounds with air or oxygen in the presence of both an inorganic salt of iron and ammonia or a primary amine, together with a small proportion of water or water vapor, as catalyst materials for promoting the condensation reaction to obtain liquid polysulfide polymers containing reactive mercapto groups, which liquid polysulfide polymers are capable of being cured or further oxidized to form normally solid rubbery products.

The iron salts to be employed as catalysts or promoters for the condensation reaction are inorganic salts which are soluble in the di(mercaptoethyl)ethers of diols starting materials. Examples of such iron salts are ferric chloride, ferric bromite, ferric nitrate, ferric sulfate, ferrous sulfate, ferrous chloride or ferrous bromide. The iron salts can be employed in amounts corresponding to from 0.00005 to 0.1, preferably from 0.001 to 0.01, percent by weight of the starting material. With smaller amounts of the iron salt, e. g. ferric chloride, the condensation reaction proceeds at a slow rate. Larger proportions of the iron salt result in the formation of a polymer product of darker color than is usually desired.

The iron salts are preferably used in anhydrous or substantially anhydrous condition, although the iron salts containing water of crystallization such as $FeBr_3 \cdot 6H_2O$, $FeCl_3 \cdot 6H_2O$, $Fe(NO_3)_3 \cdot 9H_2O$, $FeSO_4 \cdot 7H_2O$ or $$FeCl_2 \cdot 4H_2O$$

can be used.

The inorganic iron salts are employed, together with a nitrogen-containing base such as ammonia or a primary amine. Examples of suitable primary amines are methylamine, ethylamine, propylamine, butylamine, hexylamine, dodecylamine, ethylenediamine, diethylenetriamine, triethylenetetramine, ethanolamine, isopropanolamine, cyclohexylamine, aniline, benzylamine, etc. The ammonia or primary amine can be used in amounts of from 0.01 to 5, preferably from 0.05 to 1, percent by weight of the di(2-mercaptoethyl)ether of a diol starting material employed.

The ammonia or primary amine can be mixed with the di(2-mercaptoethyl)ether of diol starting material or with a stream of air or oxygen gas fed into admixture with the liquid starting material containing the iron salt in the desired proportion. For convenience in handling, the volatile nitrogen-containing bases, such as ammonia or methyl amine, can readily be added to the mixture by bubbling a stream of air or oxygen through an aqueous solution of the same and feeding the moist vapors into admixture with the di(2-mercaptoethyl)ether containing the iron salt. When the amine is a liquid or solid which can conveniently be handled, it is preferably added directly to the di(2-mercaptoethyl)ether of diol starting material, as is the inorganic iron salt.

Mixtures of any two or more of the inorganic iron salts and mixtures of ammonia and one or more primary amines or mixtures of any two or more primary amines can be used as the catalyst materials for promoting the condensation of di(2-mercaptoethyl)ethers of diols having the aforementioned general formula in the presence of oxygen or air to form polysulfide resins as herein described.

The catalyst materials, i. e. the iron salt and the ammonia or primary amine, are most effective in promoting the condensation or oxidation reaction of the di(2-mercaptoethyl)ethers of diols to form polysulfide liquid polymers when employed in the presence of small amounts of water, e. g. from 0.1 to 2 percent by weight of the water based on the di(mercaptoethyl)ether of diol starting material. Usually an amount of water such as the water vapor carried in a stream of air or oxygen, obtained by bubbling the gas through a tank of water, is satisfactory. The reaction can be initiated without adding water to the mixture or to the stream of oxygen gas, although in such instance the rate of reaction is somewhat slower than when water is used. It may be mentioned that the oxidation reaction has not been carried out under truly anhydrous condition. However, since water is a by-product of the reaction it appears that a trace amount of water or water vapor facilitates the oxidation reaction. The proportion of water should not exceed the amount which can be dissolved in the mixture and lesser amounts are usually required. The water can be employed in amounts of from 0.05 to 5, preferably from 0.05 to 1, percent by weight of the starting material.

The condensation or oxidizing reaction can be carried out at temperatures between 20° and 200° C., preferably from 70° to 120° C., and at atmospheric or superatmospheric pressures. The reaction is somewhat sluggish at room temperature or thereabout, and at higher temperatures, e. g. at tempeatures of from 150° to 200° C. within the range stated, results in a product of somewhat darker color than is obtained at reaction temperatures within the preferred temperature range, under otherwise similar reaction conditions.

In a peferred practice, the di(2-mercaptoethyl)ether of a diol starting material, together with the inorganic iron salt such as anhydrous ferric chloride or ferric bomide, ae mixed together in the desired proportions. The mixture is agitated and maintained at a reaction temperature within the range of from about 20° to 200° C., preferably from 70° to 120° C., and air or oxygen gas, suitably saturated with water vapor, and in admixture with ammonia or a volatile primary amine, e. g. methylamine, in the desired proportion is fed into contact or admixture with the liquid di(2-mercaptoethyl)ether of a diol starting material containing the iron salt suitably at atmospheric or substantially atmospheric pressure. The reaction is continued until the desired degree of condensation or polymerization of the compound is attained, suitably until the mixture has an absolute viscosity corresponding to from 500 to 100,000 centipoises at 25° C., and prior to gelling of the mixture. The reaction is discontinued by stopping feed or contact of the air or oxygen with the mixture.

The resulting product is a liquid polysulfide resin containing reactive mercapto groups and can readily be oxidized, e. g. by treatment with a further amount of oxygen or air, or cured by substances which condense with the hydrogen of the mercapto groups and act as curing agents, to form normally solid rubbery materials. For these reasons the liquid polysulfide resins are maintained in the absence or substantial absence of air or oxygen prior to their final use in the preparation of an end product.

The following examples illustrate ways in which the principle of the invention has been applied, but are not to be construed as limiting its scope.

EXAMPLE 1

(A) A solution of 1000 grams of diethylene glycol and 50 grams of solid potassium hydroxide was placed in a pressure resistant vessel. The mixture was stirred and heated at temperatures between 180° and 190° C. in admixture with acetylene at pressures between 70 and 100 pounds per square inch gauge pressure for a period of time of 5 hours, then was cooled to room temperature and the unused acetylene vented. The crude product was removed from the reaction vessel and was distilled. There was obtained approximately 400 grams of divinyl ether of diethylene glycol as a colorless liquid boiling at 110° C. at 25 millimeters absolute pressure.

(B) A charge of one part by weight of the divinyl ether of diethylene glycol prepared in part (A) above and two parts of liquid hydrogen sulfide was sealed in a pressure resistant vessel equipped with transparent well for exposing the mixture to rays of ultraviolet light. The mixture was maintained at temperatures between 0° and 5° C. under pressures of from 180 to 210 pounds per square inch gauge pressure while exposing the same to rays from a 15 watt germicidal lamp (General Electric Company) for a period of one hour. Thereafter, the hydrogen sulfide was vented. The liquid product was removed from the reaction vessel and was distilled. The product, i. e. di(2-mercaptoethyl)ether of diethylene glycol, was obtained as a mobile liquid boiling at 130° C. at one millimeter absolute pressure. The product had a density of 1.1114 at 25° C. compared to that of water at 4° C., a refractive index of $n_D^{25}$ 1.4990 and contained 28.3 percent by weight of sulfur by analysis.

(C) A charge of 100 grams of the di(2-mercaptoethyl)ether of diethylene glycol having an absolute viscosity of 10 centipoises at 25° C., prepared in part (B) above and 0.0001 gram of anhydrous ferric chloride was placed in a glass reaction vessel. The mixture was maintained at a temperature of about 93° C. on a steam bath. Thereafter, a stream of oxygen was bubbled through a concentrated aqueous solution of ammonium hydroxide (approximately 29 weight percent of ammonia) and the moist oxygen gas, containing ammonia and water vapors, was bubbled through the liquid di(2-mercaptomethyl)-ether of diethylene glycol containing the trace of ferric chloride over a period of time of 35 hours at a rate such that slight excess of oxygen was present in the exit gases vented from the reaction. The feed of oxygen gas was discontinued and the product was allowed to cool to room temperature. The product was a pale amber-colored polysulfide liquid resin having an absolute viscosity of 100,000 centipoises at 25° C. and contained reactive mercapto groups.

EXAMPLE 2

A charge of 100 grams of a batch of di(2-mercaptoethyl)ether of diethylene glycol

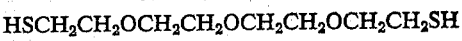

and a batch of 0.001 gram of anhydrous ferric chloride was placed in a glass reaction vessel equipped with an inlet tube for feeding vapors into the liquid mixture. The mixture was heated on a steam bath to a temperature of 93° C. Oxygen was bubbled through a column of concentrated aqueous ammonium hydroxide solution (approximately 29 weight percent of ammonia) and the moist oxygen, containing ammonia and water vapors, was fed into the heated liquid mixture over a period of 10 hours at a rate such that a slight excess of oxygen was present in the exit gases vented from the reaction. The product was a pale amber colored liquid having an absolute viscosity of 2000 centipoises at 25° C.

For purpose of comparison, a charge of the di(2-mercaptoethyl)ether of diethylene glycol was oxidized under the same time and temperature conditions with oxygen and ammonia, but without the ferric chloride. After 10 hours reaction time the product had an absolute viscosity of only 20 centipoises at 25° C.

EXAMPLE 3

A charge of 100 grams of the batch of the di(2-mercaptoethyl)ether of diethylene glycol described in Example 2, and 0.01 gram of anhydrous ferric chloride was placed in a glass reaction vessel. The mixture was heated on a steam bath to a temperature of 93° C. and was oxidized by treating the same with oxygen bubbled through a concentrated aqueous solution of ammonium hydroxide employing procedure as described in Example 1. After 10 hours reaction time the product was a viscous dark colored liquid having an absolute viscosity of 100,000 centipoises at 25° C.

For purpose of comparison, a similar charge of the di(2-mercaptoethyl)ether of diethylene glycol and the anhydrous ferric chloride was oxidized by bubbling oxygen, without ammonia vapors, through the mixture heated at a temperature of 93° C. for a period of 10 hours. The product had an absolute viscosity of only 50 centipoises at 25° C.

mixed with 0.6 gram of 1,2,3-trimercaptopropane and 20 grams of C–5 Cure (a mixture of 50 percent by weight of lead peroxide, 45 percent of dibutyl phthalate and 5 percent of stearic acid) at room temperature. Within 5 minutes a noticeable exothermic reaction occurred, and after a period of one hour the material was a tough rubbery solid product. The rubbery product was insoluble in usual organic solvents such as benzene, toluene, ethylene dichloride, carbon tetrachloride and petroleum naphtha, and was highly resistant to change upon exposure to out-of-doors weathering.

EXAMPLE 6

In each of a series of experiments, a charge of 100 grams of di(2-mercaptoethyl)ether of diethylene glycol, 0.001 gram of anhydrous ferric chloride, together with a primary amine in amount and kind as stated in the following table, was placed in a glass reaction vessel. The mixture was heated and maintained at a temperature of 93° C. on a steam bath. Thereafter, oxygen was bubbled through water and the vapors were fed into admixture with the liquid di(2-mercaptoethyl)ether of diethylene glycol containing the ferric chloride and the amine for a period of time of from 10 to 11 hours. The table identifies the experiments, names the amine and gives the proportions of the amine and the ferric chloride employed. The table also gives the absolute viscosity of the product in centipoises at 25° C. In the table, the term "dimercaptan" designates di(2-mercaptoethyl)ether of diethylene glycol of the formula $$HSCH_2CH_2OCH_2CH_2OCH_2CH_2OCH_2CH_2SH$$

for brevity.

*Table*

| Run No. | Starting Materials | | | Reaction Conditions | | | Product, Viscosity, cps. 25° C. |
|---|---|---|---|---|---|---|---|
| | Dimercaptan, gms. | Amine | | FeCl₃, gms. | Temp., °C. | Time, hrs. | |
| | | Kind | gms. | | | | |
| 1 | 100 | Ethylenediamine | 1 | 0.001 | 93 | 11 | 500 |
| 2 | 100 | Ethanolamine | 2 | 0.001 | 93 | 10 | 700 |
| 3 | 100 | Octadecylamine | 1 | 0.001 | 93 | 11 | 500 |
| 4 | 100 | Aniline | 1 | 0.001 | 93 | 10 | 650 |

EXAMPLE 4

A charge of 100 grams of the di(2-mercaptoethyl)ether of diethylene glycol described in Example 2, and 0.001 gram of anhydrous ferric chloride was placed in a glass reaction vessel. The mixture was heated at a temperature of 150° C. Oxygen was bubbled through a column of concentrated aqueous ammonium hydroxide solution, then fed into admixture with the liquid material over a period of 8 hours. The product was a viscous dark brown liquid having an absolute viscosity of 100,000 centipoises at 25° C.

EXAMPLE 5

A charge of 100 grams of di(2-mercaptoethyl)ether of diethylene glycol similar to that described in Example 2, and 0.001 gram of anhydrous ferric chloride was placed in a glass reaction vessel. The mixture was heated at a temperature of 93° C. on a steam bath. Thereafter, oxygen was bubbled through an aqueous 40 weight percent solution of methylamine and the vapors fed into the heated liquid di(2-mercaptoethyl)ether of diethylene glycol over a period of 15 hours. The product was a liquid polysulfide resin having an absolute viscosity of 1000 centipoises at 25° C.

For purpose of demonstrating that the above liquid polysulfide resin contains reactive mercapto groups, a charge of 30 grams of the liquid polysulfide resin was

EXAMPLE 7

A charge of 100 grams of di(2-mercaptoethyl)ether of tetraethylene glycol

a mobile liquid boiling at 192.5° C. at 0.7 millimeter absolute pressure, having a density of 1.1153 at 25° C. compared to water at 4° C. a refractive index of $n_D^{25}$ 1.4910 and containing 20.37 percent by weight of sulfur by analysis, and 0.001 gram of anhydrous ferric chloride was placed in a glass reaction vessel. The mixture was heated and maintained at a temperature of 93° C. on a steam bath. Thereafter, oxygen was bubbled through a concentrated aqueous solution of ammonium hydroxide and the vapors fed into admixture with the liquid material over a period of 10 hours at a rate such that a slight excess of oxygen was present in the gases vented from the reaction. The product was a liquid polymerized material having an absolute viscosity of 1500 centipoises at 25° C.

EXAMPLE 8

A charge of 100 grams of di(2-mercaptoethyl)ether of tetraethylene glycol similar to that described in Example 7, and 0.001 gram of anhydrous ferric sulfate $Fe_2(SO_4)_3$ was oxidized employing procedure similar to that employed in Example 6. The product was a liquid having a viscosity of 1450 centipoises at 25° C.

EXAMPLE 9

A charge of 5 grams of di(2-mercaptoethyl)ether of 1,4-butane diol, a mobile liquid boiling at 102° C. at 0.6 millimeter absolute pressure, together with 0.002 percent by weight of anhydrous ferric chloride, was placed in a glass vessel. The mixture was heated to about 93° C. Thereafter, a stream of oxygen gas was bubbled through a concentrated aqueous solution of ammonium hydroxide and the moist vapors comprising oxygen, ammonia and water were bubbled through the liquid mercaptan for a period of 15 hours. The product was a viscous liquid.

EXAMPLE 10

A charge of 5 grams of di(2-mercaptoethyl)ether of dipropylene glycol containing 0.001 percent by weight of ferric chloride was placed in a glass vessel. The mixture was heated at a temperature of about 93° C. Moist oxygen gas containing ammonia and water vapors was bubbled through the liquid material employing procedure as described in Example 8 for a period of 10 hours. The product was a liquid having an absolute viscosity of 1000 centipoises at 25° C.

I claim:

1. A process for making a polysulfide liquid polymer containing reactive mercapto groups, which process comprises oxidizing a di(2-mercaptoethyl)ether of a diol, which ether has the general formula:

$$HSCH_2CH_2O-(RO)_n-CH_2CH_2SH$$

wherein RO represents at least one oxyalkylene radical selected from the group consisting of oxyethylene, oxypropylene and oxybutylene radicals and $n$ is a whole number from 1 to 4, by bringing oxygen gas into admixture with said ether at reaction temperatures between 0° and 150° C. in the presence of a catalyst material consisting of from 0.00005 to 0.1 percent of an inorganic iron salt of a strong mineral acid and from 0.01 to 5 percent of at least one nitrogen-containing base selected from the group consisting of ammonia and primary amines, based on the weight of said ether, and discontinuing said oxidizing reaction prior to gelling of the mixture.

2. A process as claimed in claim 1, wherein the gaseous oxygen is substantially saturated with vapors of water.

3. A process as claimed in claim 2, wherein the inorganic iron salt is ferric chloride.

4. A process as claimed in claim 2, wherein the nitrogen-containing base is ammonia.

5. A process as claimed in claim 2, wherein the nitrogen-containing base is methylamine.

6. A process as claimed in claim 1, wherein the di(2-mercaptoethyl)ether is di(2-mercaptoethyl)ether of diethylene glycol.

7. A process for making a polysulfide liquid polymer containing reactive mercapto groups which process comprises oxidizing di(2-mercapto)ether of diethylene glycol of the formula $$HSCH_2CH_2OCH_2CH_2OCH_2CH_2OCH_2CH_2SH$$

by bringing oxygen gas containing vapors of water into admixture with said ether at reaction temperatures between 0° and 150° C. in the presence of a catalyst material consisting of from 0.00005 to 0.1 percent of ferric chloride and from 0.01 to 5 percent of a nitrogen-containing base selected from the group consisting of ammonia and primary amines, based on the weight of said ether and discontinuing said oxidizing reaction when the mixture has an absolute viscosity between 500 and 100,000 centipoises at 25° C.

8. A process for making a polysulfide liquid polymer containing reactive mercapto groups, which process comprises oxidizing di(2-mercapto)ether of 1,2-propylene glycol of the formula $$HSCH_2CH_2OCHCH_3CH_2OCH_2CH_2SH$$

by bringing oxygen gas containing vapors of water into admixture with said ether at reaction temperatures between 0° and 150° C. in the presence of a catalyst material consisting of from 0.00005 to 0.1 percent of ferric chloride and from 0.01 to 5 percent of ammonia, based on the weight of said ether, and discontinuing said oxidizing reaction when the mixture has an absolute viscosity between 500 and 100,000 centipoises at 25° C.

9. A process for making a polysulfide liquid polymer containing reactive mercapto groups, which process comprises oxidizing di(2-mercaptoethyl)ether of 1,4-butane diol of the formula $$HSCH_2CH_2OCH_2CH_2CH_2CH_2OCH_2CH_2SH$$

by bringing oxygen gas containing vapors of water into admixture with said ether in the presence of a catalyst material consisting of from 0.00005 to 0.1 percent of ferric chloride and from 0.01 to 5 percent of ammonia, based on the weight of said ether, and discontinuing said oxidizing reaction when the mixture has an absolute viscosity between 500 and 100,000 centipoises at 25° C.

10. A process for making a polysulfide liquid polymer containing reactive mercapto groups which process comprises oxidizing di(2-mercaptoethyl)ether of ethylene glycol of the formula $HSCH_2CH_2OCH_2CH_2OCH_2CH_2SH$ by bringing oxygen gas containing vapors of water into admixture with said ether at reaction temperatures between 0° and 150° C. in the presence of a catalyst material consisting of from 0.00005 to 0.1 percent of ferric chloride and from 0.01 to 5 percent of ammonia, based on the weight of said ether, and discontinuing said oxidizing reaction when the mixture has an absolute viscosity between 500 and 100,000 centipoises at 25° C.

11. A process for making a polysulfide liquid polymer containing reactive mercapto groups which process comprises oxidizing di(2-mercaptoethyl)ether of diethylene glycol of the formula $$HSCH_2CH_2OCH_2CH_2OCH_2CH_2OCH_2CH_2SH$$

by bringing oxygen gas containing vapors of water into admixture with said ether at reaction temperatures between 0° and 150° C. in the presence of a catalyst material consisting of from 0.00005 to 0.1 percent of ferric chloride and from 0.01 to 5 percent of ammonia, based on the weight of said ether and discontinuing said oxidizing reaction when the mixture has an absolute viscosity between 500 and 100,000 centipoises at 25° C.

References Cited in the file of this patent

UNITED STATES PATENTS 2,584,264    Foulks                Feb. 5, 1952

FOREIGN PATENTS 464,356    Great Britain         Apr. 16, 1937

UNITED STATES PATENT OFFICE
CERTIFICATE OF CORRECTION

Patent No. 2,866,776  
December 30, 1958

William R. Nummy

It is hereby certified that error appears in the printed specification of the above numbered patent requiring correction and that the said Letters Patent should read as corrected below.

Column 2, line 47, for "bromite" read -- bromide --; column 3, line 58, for "ae" read -- are --; column 7, line 58, and column 8, line 8, for "di(2-mercapto)ether" read -- di(2-mercaptoethyl)ether --.

Signed and sealed this 28th day of July 1959.

(SEAL)  
Attest:  
KARL E. AXLINE  
Attesting Officer

ROBERT C. WATSON  
Commissioner of Patents